(No Model.) 2 Sheets—Sheet 1.
J. D. WALSH.
Cotton Planter and Cultivator.
No. 230,451. Patented July 27, 1880.
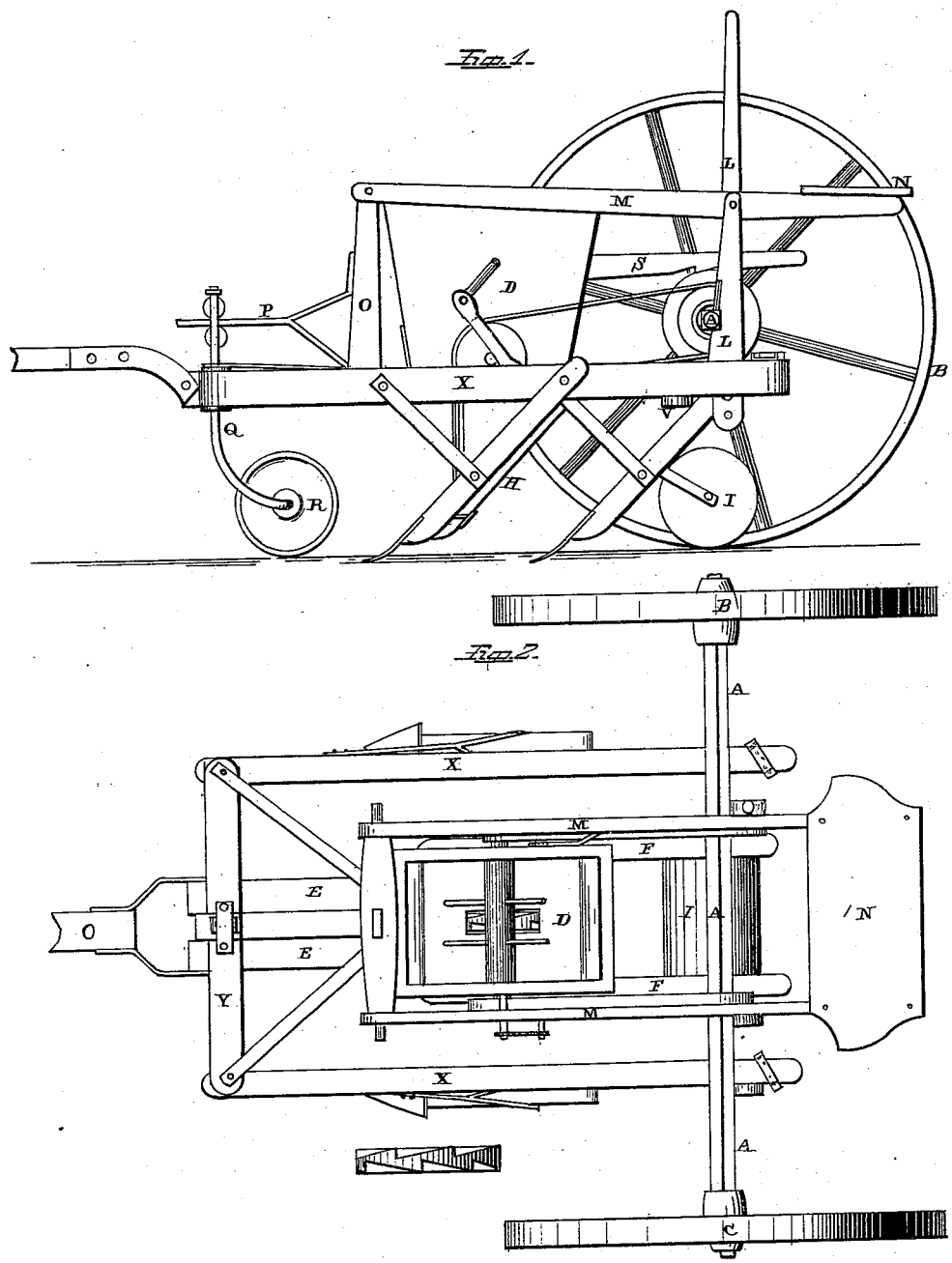
Witnesses=
W. W. Mortimer
W. H. Kern
Inventor=
Jas. D. Walsh,
per
F. A. Lehmann.

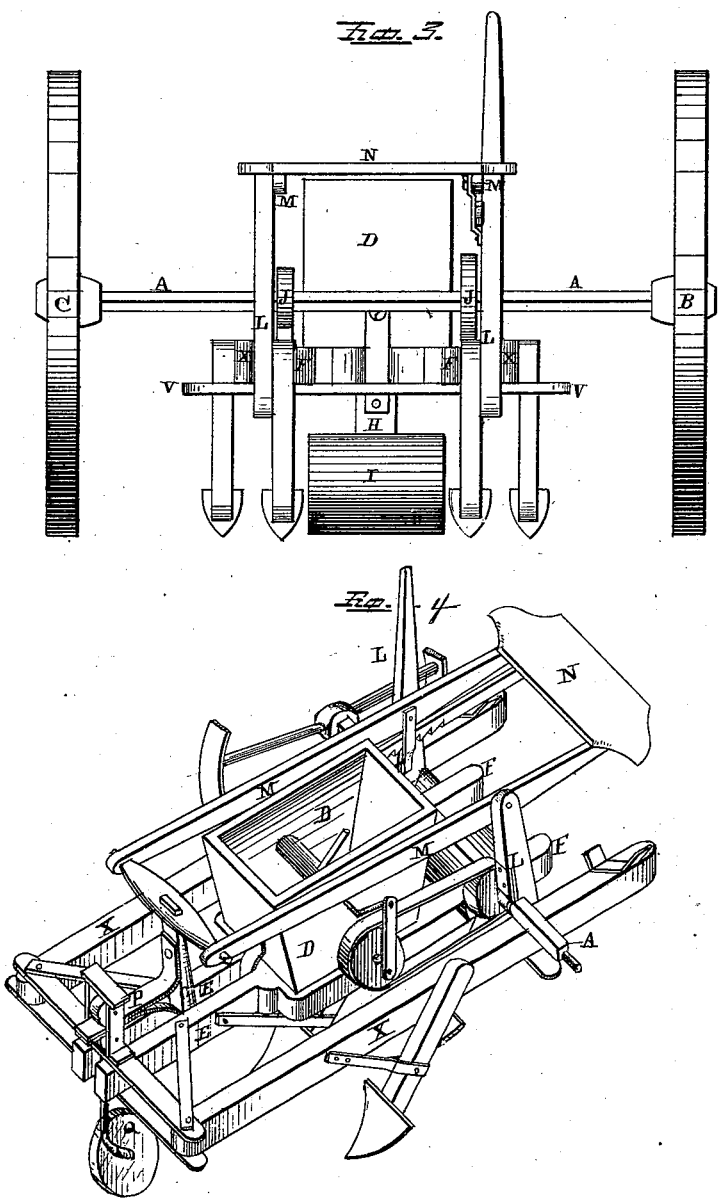

UNITED STATES PATENT OFFICE.

JAMES D. WALSH, OF COKE, TEXAS.

COTTON PLANTER AND CULTIVATOR.

SPECIFICATION forming part of Letters Patent No. 230,451, dated July 27, 1880.

Application filed May 13, 1880. (No model.)

*To all whom it may concern:*

Be it known that I, JAMES D. WALSH, of Coke, in the county of McLennan and State of Texas, have invented certain new and useful Improvements in Cotton Planters and Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cotton planters and cultivators; and it consists in attaching to the axle one or more levers, which are pivoted to a frame below the axle, and which levers are also connected with the caster-wheel in front, whereby the frame may be raised so as to elevate the cultivators above the earth.

It further consists in the arrangement and combination of parts, which will be more fully described hereinafter, whereby the cotton is planted, covered, and rolled at the same time.

Figure 1 is a side elevation of my invention. Fig. 2 is a plan view of the same. Fig. 3 is a rear view. Fig. 4 is a perspective of my invention, having the drive-wheel removed on the near side.

A represents the axle, which is supported upon the two driving-wheels B C, one of which wheels is rigidly secured to the axle, so as to cause it to revolve, for the purpose of operating the seed mechanism, while the other one turns loosely upon its spindle.

The seed-box D is supported upon the two parallel beams E, which are united together at their front and rear ends and upon the two cultivator-beams F, which are secured to the outer sides of the two beams E. To the rear ends of the two beams E is secured the central cultivator, H, which is placed immediately under the seed-tube, and which has a grain-tube secured upon its front edge, so as to conduct the seed into the furrow which is opened by its shovel.

To the rear ends of the two beams F are secured similar cultivators, which are so turned as to cover the cotton as fast as it is dropped in the furrow. Pivoted, by means of suitable connecting-rods, in between the two covering-cultivators is the roller I, which roller rolls the earth upon the seed.

Fastened to the axle are two driving-pulleys, J, of unequal size, and passing through below the center of the seed-box is the shaft which has the seed-cylinder secured to it, and which shaft has a large pulley upon one end and a small pulley upon the other. The larger one of these two pulleys upon the seed-shaft is placed just opposite the smaller one of the two pulleys J, secured to the axle, and the smaller one of the two pulleys is placed opposite to the largest pulley J on the axle. By changing the driving-belt from one side of the box to the other a faster or a slower motion may be obtained, as may be desired, and thus the seed can be planted nearer together or farther apart, at the will of the operator.

Pivoted upon the axle by means of suitable connecting-straps are the two levers L, one of which projects above the frame M, upon which the seat N is placed, so as to be readily grasped and operated by the driver. These two levers are pivoted at their lower ends upon the outer sides of the two covering-cultivators or to the frame to which these cultivators are secured, and are also pivoted to the frame M, as shown. In the lower ends of these two levers L are made a series of holes, so that the depth to which the cultivators shall run can be regulated at will. This frame M is rectangular in shape and projects forward beyond the front edge of the seed-box, where it is secured to the upper end of the pivoted lever O. This lever O has projecting outward from its front side a suitable arm or lever, P, which is slotted at its front end, and which arm or lever P catches over the upper end of the standard Q of the caster-wheel R.

Pivoted to the side of the seed-box is a stop or catch, S, which consists of a long rod having notches formed in its under edge, and which notches catch over a point or projection on the inside of the operating-lever, so as to hold the lever rigidly in any desired position.

When the operating-lever is moved forward the axle is moved forward, and the frame upon which the seed-box is placed is moved correspondingly backward, and the belt upon the driving-pulleys is at once slackened, so that the seed will no longer be dropped. This lever in moving forward will also force forward the frame M; and this frame being secured at its front end to the pivoted lever O, the lever O is forced forward, so as to depress the standard of the caster-wheel, and thus the front end of the frame is raised sufficiently to move the cultivators high enough above the ground not to be brought in operation as the machine is being moved about from place to place.

The two outer beams, X, are pivoted in suitable cross-bars Y at their front ends, and are left free to be moved in and out at their rear ends, so as to be made to adapt themselves to any width of rows. The driver, sitting on the seat N, guides these two beams by means of his feet, in the usual manner. When these beams are not in use their rear ends are held supported above the ground by means of a cross-beam, V.

While cotton is being planted the stirring device is kept constantly in motion by means of one of the driving-pulleys on the side of the seed-box; but when it is desired to plant corn one of the pulleys is removed, the shaft is drawn out, and the seed-cylinder used in planting cotton is removed, and a cylinder for planting corn placed upon the shaft. The machine can then be used for planting, covering, and rolling the corn in the same manner as cotton.

The cylinder for planting cotton-seed has a number of alternate notches made upon opposite sides, as shown in Fig. 2, in which the seeds are caught and carried down to the seed-tube. Just above this cylinder is a suitable stirring device, which is operated in the usual manner by the same pulley which operates the seed-cylinder. The cylinder used in planting corn may be of any desired construction.

Having thus described my invention, I claim—

1. The combination of the axle, the two levers L, connected loosely thereto, and pivoted at their lower ends to the cultivator-frame and at their other ends to the seat-frame M, with the pivoted lever O, arm or lever P, and the standard Q of the caster-wheel, substantially as shown.

2. The axle A, having the two levers L secured loosely thereto, in combination with the seat-frame M, levers O P, and the caster-wheel, with the holding device for locking the frame in any desired position, substantially as described.

In testimony that I claim the foregoing I have hereunto set my hand.

JAMES D. WALSH.

Witnesses:
CHARLES K. WALSH,
E. BEAL.